United States Patent [19]
Genise et al.

[11] Patent Number: 5,517,876
[45] Date of Patent: May 21, 1996

[54] TRANSMISSION SPRING LOADED SHIFT DEVICE

[75] Inventors: Thomas A. Genise, Dearborn; Ronald K. Markyvech, Allen Park, both of Mich.

[73] Assignee: Eaton Corporation, Cleveland, Ohio

[21] Appl. No.: 286,122

[22] Filed: Aug. 4, 1994

[51] Int. Cl.⁶ .......................... F16H 59/02; F16H 63/32
[52] U.S. Cl. ........................ 74/473 R; 192/109 A
[58] Field of Search ................. 74/473 R; 192/109 A

[56] References Cited

U.S. PATENT DOCUMENTS

| | | | |
|---|---|---|---|
| 4,449,416 | 5/1984 | Huitema | 192/109 A X |
| 4,497,396 | 2/1985 | Davis | 192/109 A X |
| 4,498,350 | 2/1985 | Ross | 192/109 A X |
| 4,938,088 | 7/1990 | Langley et al. | 192/109 A X |

*Primary Examiner*—Allan D. Herrmann
*Attorney, Agent, or Firm*—Loren H. Uthoff, Jr.; Howard D. Gordon

[57] ABSTRACT

A transmission shifting system for a gear change transmission where an actuator responding to a control signal is used to axially displace a secondary shift rail thereby preloading a spring acting upon a primary shift rail where a coupling element permits relative motion between the secondary shift rail and the primary shift rail until gear synchronization or a torque break occurs allowing the desired gear shift to occur. The relative motion which results in a spring preload force to be generated on the primary shift rail continues until the secondary shift rail contacts the portion of the coupler adjacent to a primary flange formed as part of the primary shift rail whereupon the actuator is solidly linked to the shift rail and a shift fork.

9 Claims, 4 Drawing Sheets

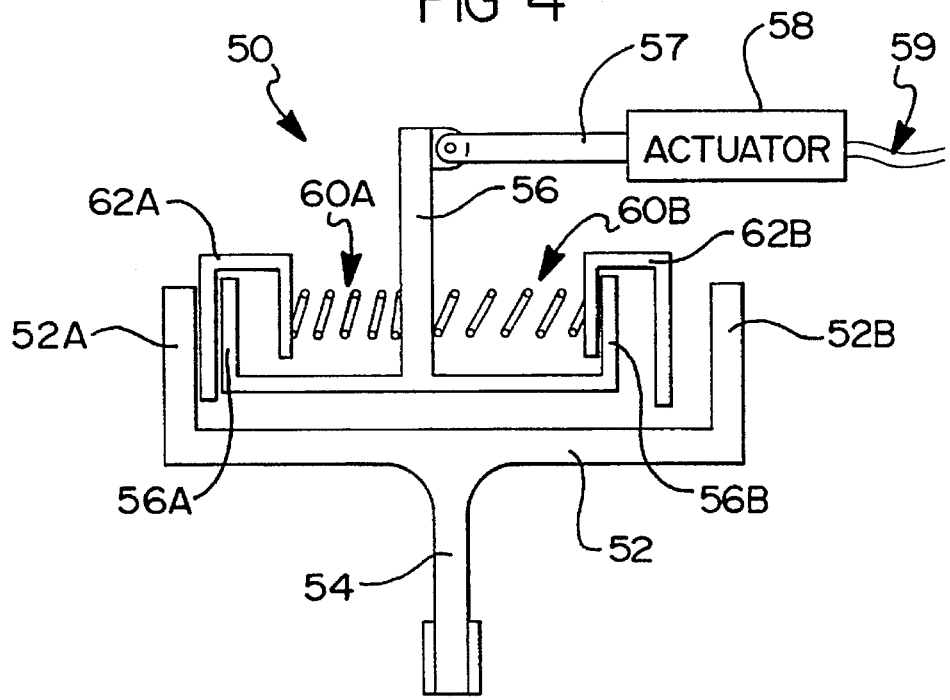
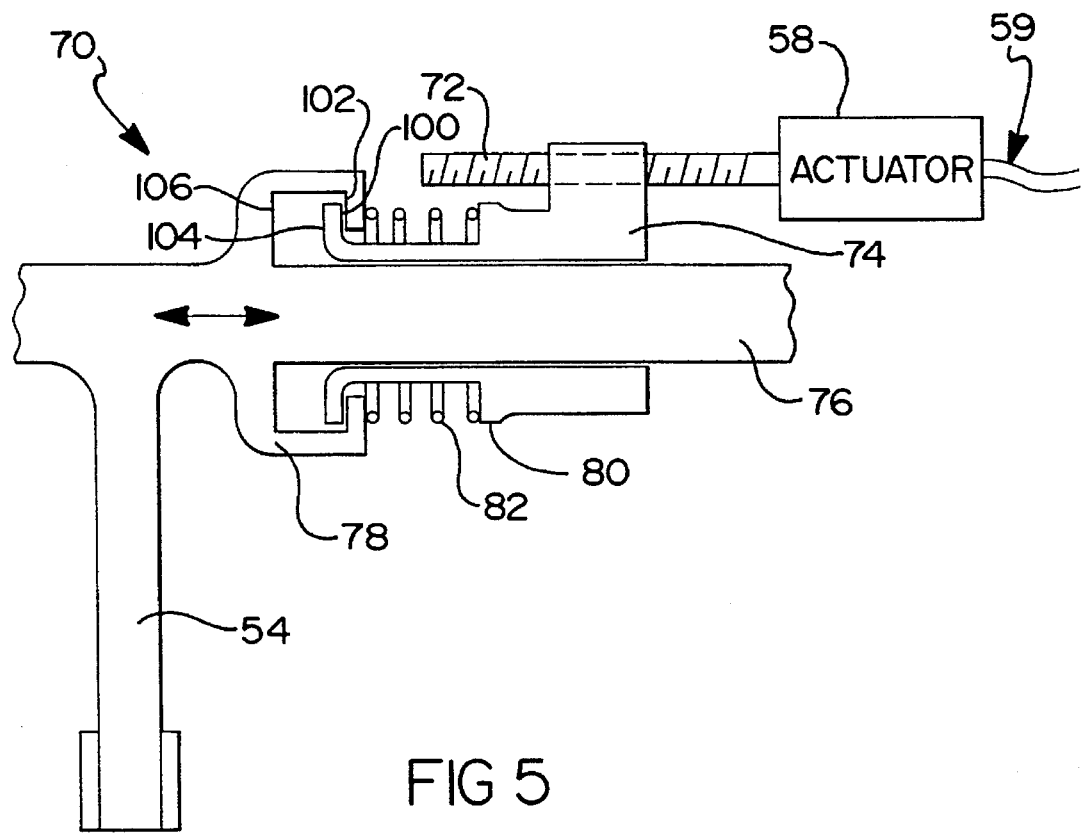

5,517,876

TRANSMISSION SPRING LOADED SHIFT DEVICE

RELATED APPLICATIONS

This application relates to patent application U.S. Ser. No. 08/150,672, entitled "Preselect Shift Strategy Using Stored Energy", filed on Nov. 10, 1993, and assigned to the same assignee, Eaton Corporation, as this application and to patent application U.S. Ser. No. 08/280,966, entitled "Transmission Shifting Mechanism With Spring Loaded Ball Screw, filed on Jul. 27, 1994, and assigned to the same assignee, Eaton Corporation, as this application.

BACKGROUND OF THE INVENTION

1. Field of the Invention

The present invention relates to a shifting mechanism for a gear change transmission and more specifically to a shifting mechanism for a gear change transmission where the shift forks are initially moved and/or preloaded by a plurality of springs displaced by a linear actuator.

2. Description of the Prior Art

Gear change transmissions utilizing shift bar housing assemblies wherein one or more axially moveable shift bars, also known as shift rails or shift rods, each carrying or associated with a shift fork, are selectively axially moved to engage or disengage a selected transmission gear. The movement of the shift bar causes an axial movement of a clutch member, or of a gear carrying clutch teeth or of a jaw clutch, as are well known in the prior art, and may be seen by reference to U.S. Pat. Nos. 4,445,393; 4,754,665; 4,876, 924; and 5,053,961, the disclosures of which are hereby incorporated by reference.

Non-operator actuated shift bar housing assemblies which are usually actuated by pressurized hydraulic fluid, pressurized air, or electric motors and the controls therefor, are also well known in the prior art, as may be seen by reference to U.S. Pat. Nos. 4,428,248; 4,445,393; 4,722,237 and 4,873, 881, all assigned to the assignee of this invention and all hereby incorporated by reference.

While the prior art actuated shift bar housing assemblies are generally satisfactory and are presently utilized or under development for remotely controlled and/or automatically controlled change gear transmissions, the prior art assemblies are not totally satisfactory as they are complicated and/or expensive to produce, install and/or service. These prior art systems are also slow and difficult to control due to the compressibility of the fluid used to power the shift rails or the high current experienced by the electric actuators when a gear change cannot be immediately effectuated due to non-synchronization or torque loading in the gear box.

SUMMARY OF THE INVENTION

In accordance with the present invention, the drawbacks of the prior art when an electric actuator is used are minimized or overcome to the extent that an electrical actuator is used to load a spring that forces the shift fork toward the desired position so that a gear shift can be completed when synchronization of the transmission or a torque break occurs. With the use of the shifting mechanism of the present invention no special control strategies are required to prevent excess motor current when a shift cannot be immediately effectuated which minimizes the disadvantages of the prior art shifting systems.

The present invention for a gear change transmission shifting system utilizes some type of electrical actuator such as an electric motor driving a ball ramp mechanism to axially displace a secondary shift rail which acts to axially displace and compress an activation spring which reacts against a primary shift rail which carries a shift fork. The shift spring acts to supply a force and thus either move or preload a primary shift rail whereupon a shift fork attached to the primary shift rail is moved into a gear selection position as soon as synchronization is proper. If synchronization is not proper, the compression of the activation spring simply preloads the primary shift rail so that the shift can be effectuated as soon as synchronization occurs. As the secondary shift rail is axially displaced by the actuator to a greater extent, a shift collar is acted upon by the secondary shift rail which in turn directly acts against the primary shift rail thereby immediately transferring a substantial load (irrespective of the spring load) to the primary shift rail and consequently to the shift fork. In this manner, electrical energy supplied to the actuator is minimized when synchronization has not occurred since the actuator simply moves the linkage axially so as to preload a spring instead of directly acting against the shift fork which is held from axial movement by the non-synchronization of the gearing in the transmission. In this manner, the energy requirements of the various electrical components are optimized and the strength of the mechanical components can be reduced to reduce cost and complexity to improve overall performance of the shift mechanism.

One provision of the present invention is to provide a gear change transmission shift device that provides for a quick gear shift by preloading a spring operating against a shift fork.

Another provision of the present invention is to provide a gear change transmission shift device that minimizes the electrical current supplied to a linear actuator by preloading a spring operating against a shift fork thereby allowing full axial movement of the motor in a non-synchronous shift mode.

Another provision of the present invention is to provide a gear change transmission shift device that provides for a smooth gear shift by preloading a spring operating against the shift fork using a linear actuator.

Still another provision of the present invention is to provide a gear change transmission shift device that provides for a smooth gear shift event by first preloading a spring operating against a shift fork and subsequently applying a force directly from the gear shift linkage to the primary shift rail.

BRIEF DESCRIPTION OF THE DRAWINGS

FIG. 4 is a cross-sectional view of the gear change transmission shift device of the present invention when the shift sequence is 75% complete;

FIG. 5 is a cross-sectional view of an alternate embodiment of the gear change transmission shift device of the present invention.

DETAILED DESCRIPTION OF THE PREFERRED EMBODIMENT

Figure 1:
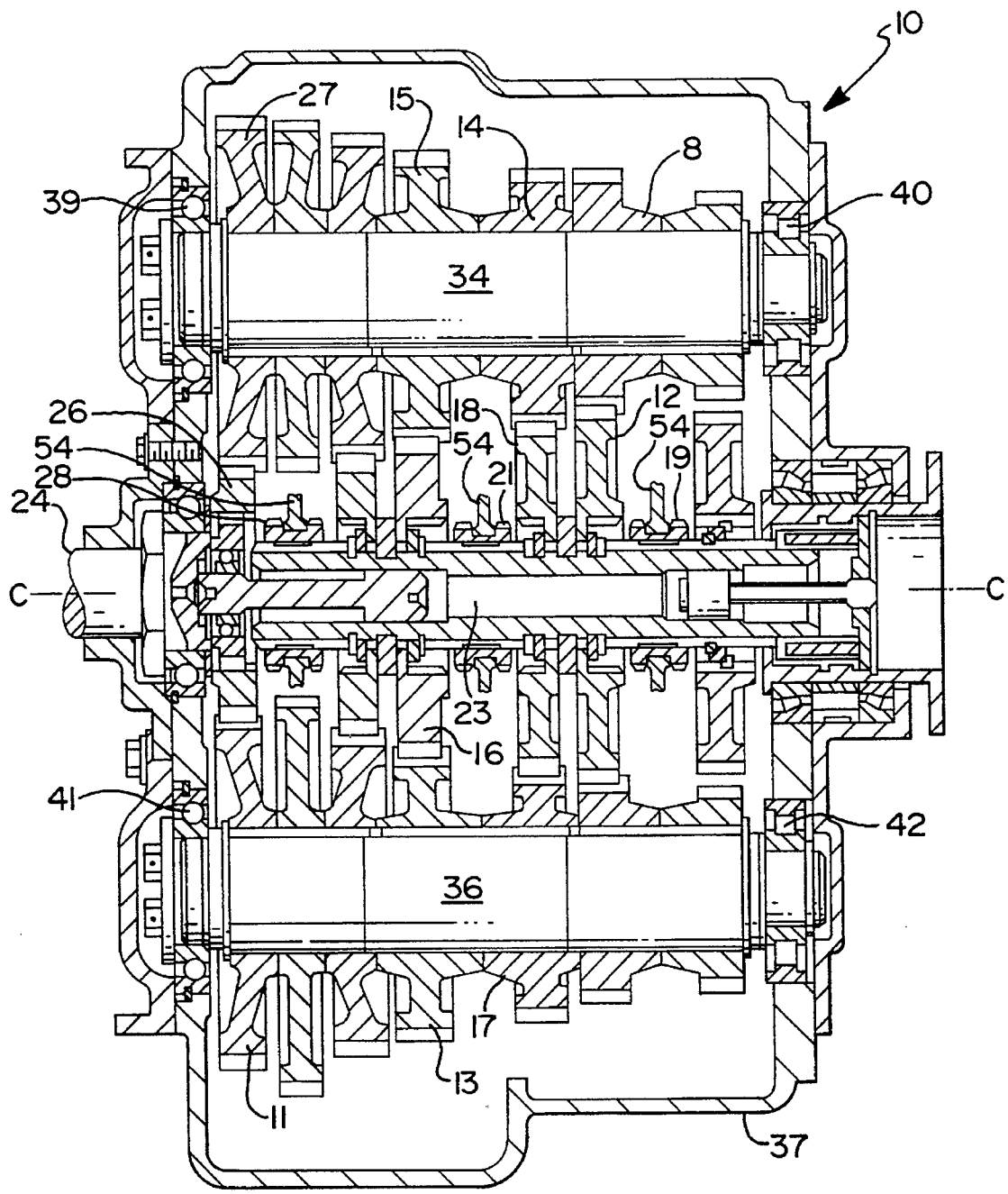
FIG. 1 is a partial cross-sectional view of a prior art gear change transmission with which the shift device of the present invention may be utilized.

In this disclosure, certain terminology will be used for convenience and reference only and will not be limiting. For example, the terms "forward" and "rearward" will refer to directions forward and rearward of the transmission or transmission shift bar housing assembly as normally mounted in a vehicle. The terms "rightward" and "leftward" will refer to directions in the drawings in connection with which the terminology is used. The terms "inwardly" and "outwardly" will refer to directions toward and away from, respectively, the geometric center of the apparatus being described. The terms "upward" and "downward" will refer to directions as taken in the drawings in connection with which the terminology is used. All foregoing terms include the normal derivatives and equivalents thereof.

Multi-speed change-gear transmissions of both the sliding gear type and the sliding clutch type are well known in the prior art and examples thereof may be seen by reference to U.S. Pat. Nos. 3,387,501; 4,273,004; and 4,296,642 the disclosures of which are incorporated by reference. By "sliding gear type" it is meant those wherein selected gears are moved into meshing engagement with other gears, and by "sliding clutch type" it is meant those wherein constantly meshed gears are selectively clutched to a shaft by means of an axially slidable clutch. The present invention may be utilized with either of these type of transmissions and with any other type requiring an axial movement to effectuate a gear ratio shift.

In transmissions of either of the types described above, the slidable member (gear or clutch) is provided with a groove in which a shift fork or shift yoke (or other shifting element) is received for imparting a selected axial movement thereto. The shift forks or yokes are typically carried by, or at least selectively axially moved by, an axially moveable shift rail or shift bar. The shift rail and shift fork carried thereby typically have an axially centered or non-displaced neutral position, and are axially moveable therefrom in first and second opposite axial directions, to engage first and second selected gear ratios, respectively. Accordingly, in transmissions of this type, one shift rail and one shift yoke are required for each pair of selectively engageable gears.

The construction and operation of shift rails, shift forks, etc. (which is not an essential feature of the present invention), may be better understood by reference to U.S. Pat. No. 4,550,627, assigned to the assignee of the present invention, and incorporated herein by reference.

A typical change gear transmission 10 of the "sliding clutch type" with which the ball screw shift assembly 50 (see FIG. 2) of the present invention may be advantageously utilized may be seen by reference to FIG. 1. It should be understood that the present invention may be utilized with a variety of transmission designs, especially those where the gear shifting is accomplished using some type of sliding mechanism to accomplish the shift. Prior art transmission 10 is a simple transmission, or a transmission commonly known as the twin countershaft type which is well known in the art, and which may be understood in greater detail by reference to above-mentioned U.S. Pat. Nos. 3,105,395 and 4,152,949 and whose operation is described in U.S. Pat. No. 4,550,627, assigned to the assignee of the present invention, and incorporated herein by reference.

The illustrated transmission 10 comprises an input shaft 24 carrying an input gear 26 for rotation therewith. Input shaft 24 is intended to be driven by a prime mover, such as an engine, (not shown) through a master clutch or torque converter (not shown) as is well known in the art. A pair of substantially identical countershafts 34 and 36 are rotatably mounted in a housing 37 by means of bearings 39, 40, 41 and 42 respectively. A main shaft or output shaft 23 is provided which is preferably floating and/or pivotally mounted in the transmission housing 37.

Each of the countershafts 34 and 36 carries a plurality of countershaft gears including those shown as 8, 14, 15 and 27 carried and nonrotatably attached to countershaft 34 and gears 9, 11, 13 and 17 fixed to countershaft 36 for rotation therewith. Both countershafts 34 and 36 are rotatably driven by the input shaft 24 through the input gear 26 meshing with gear 27 and gear 11 respectively. A plurality of countershaft gears are constantly meshed with respective mainshaft gears such as countershaft gears 15, 14 and 8 with their respective mainshaft gears 16, 18 and 12. Likewise the countershaft gears 13, 17 and 9 are constantly meshed with mainshaft gears 16, 18 and 12 respectively. The simultaneous meshing of the gears on both countershaft 34 and countershaft 36 allows the input load to be split which gives rise to the nomenclature of the twin countershaft transmission.

The countershaft gears 27, 15, 14, 8, 11, 13, 17 and 9 are fixed to their respective countershafts 34 and 36 while the mainshaft gears 12, 16 and 18 are allowed to rotate relative to the mainshaft 23. The power of the countershafts 34 and 36 are transferred to the mainshaft 23 when one of the mainshaft gears are nonrotatably attached to the mainshaft 23 through the use of a plurality of jaw clutches 19, 21 and 28, one for every two meshing gear pairs. For example, jaw clutch 21 when slid in a forward direction along the mainshaft 23 engages the mainshaft gear 16 and nonrotatably fixes it to the mainshaft 23. Likewise, when the jaw clutch 21 is slid in a rearward direction, it engages mainshaft gear 18 and nonrotatably fixes it to the mainshaft 23. Preferably, as is well known in the art, the mainshaft 23 floats or the mainshaft gears are allowed to float to some degree relative to the countershafts 34 and 36 to allow for load sharing. The advantages of utilizing a floating mainshaft 23 and/or floating mainshaft gears are well known in the art and may be appreciated in greater detail by reference to the aforementioned U.S. Pat. No. 3,105,395.

As discussed previously, axially slidable jaw clutches 19, 21 and 28 are mounted preferably by a splined connection, to mainshaft 23 for axial sliding movement relative thereto, and for rotation therewith. Clutch 21 may be moved forward (to the left in FIG. 1) from the neutral position shown to selectively couple the mainshaft 23 to mainshaft gear 16 completing the flow of power from the input shaft 24 to the input gear 26 which rotates countershaft gears 27 and 11. The rotating countershafts drive gears 15 and 13 which are meshed to mainshaft gear 16. Since gear 16 is now nonrotatably fixed to the mainshaft, the rotational power is transferred to the rest of the driveline.

The jaw clutches 19, 21 and 28 are moved axially long the mainshaft 23 each by a shift fork 54. For example, shift fork 54 (also see FIG. 2) is received in a groove in clutch 21 for controlling the axial position of clutch 21 relative to mainshaft 23. Likewise, shift fork 54 is received in grooves in clutches 19 and 28 respectively for axially controlling the position of the clutches relative to mainshaft 23. The movement of the shift fork 54 is typically controlled by a shift lever (not shown) mounted in a shift tower mounted to the top of the case 37. The shift lever through a mechanism moves one or more shift rails to which the shift forks are attached. In the present invention, the axial movement of the shift fork 54 is controlled by a linear actuator acting on springs to preload shift rails as will be discussed with reference to FIGS. 2 and 3. Note that the gear change mechanism 50 of the present invention (see FIG. 2) is not shown in FIG. 1, but is intended to be used in such a transmission 10.

Transmission 10 is illustrated as utilizing positive non-synchronized jaw clutches, as is well known in the art. Of course, frictional clutches, synchronized positive clutches and/or blocked clutches may be utilized and are more fully described in U.S. Pat. Nos. 4,194,410; 3,924,484 and 3,799,002, the disclosures of which are hereby incorporated by reference. As only one of the clutches should be engaged at any one time to avoid damage to the transmission, the operation of the ball screw actuators should be coordinated by a suitable electronic control system (not shown) to preclude engagement of more than one gear ratio.

Figure 2:
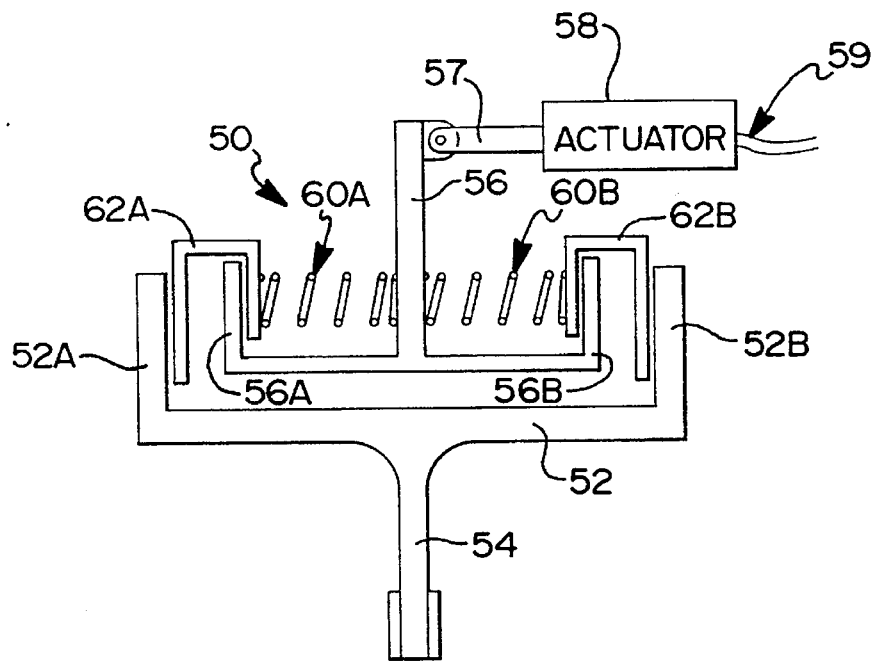
FIG. 2 is a cross-sectional view of the transmission shift device of the present invention shown in an unenergized position.

Now referring to FIG. 2 of the drawings, the gear change mechanism 50 of the present invention is shown in a cross-sectional view. One or more of mechanism 50 can be utilized to control the axial position of a like number of jaw clutches 19, 21 and 28 as shown in FIG. 1. The shift fork 54 engages one of the jaw clutches 19, 21, and 28, for example jaw clutch 21, to axially displace jaw clutch 21 rightward and leftward thereby rotationally engaging the mainshaft gears such as mainshaft gear 16 by axially displacing jaw clutch 21 leftward or likewise engaging mainshaft gear 18 which is rotationally coupled to the mainshaft 24 by axially displacing the shift fork 54 and the jaw clutch 21 in a rightward direction. Thus, the gear change mechanism 50 of the present invention axially moves a shift fork 54 leftward and rightward to cause the jaw clutch, for example, jaw clutch 21 to move to engage mainshaft gears 16 or 18 or to move axially so as to disengage mainshaft gears 16 or 18. Traditionally, the movement of the jaw clutch 21 was accomplished by mechanical linkage between a gear shift lever (not shown) and a gear box shift mechanism containing shift rails with the shift fork 54 attached thereto. A linear actuator, usually an electric motor powering a ball screw mechanism is used with the present invention to move one or more shift rails thereby taking the place of the driver/operator. The operator manipulated the shift lever to cause the shift rail to move.

To control the axial movement of the primary shift rail 52, a linear actuator 58 is used which can be any one of a variety of actuators such as an electric motor powered lead screw or ball ramp mechanism or a hydraulic actuator all of which are controlled by some type of electronic control system supplying a signal to the linear actuator 58. The control signal is routed to the actuator 58 through power leads 59 which supply current to, for example, an electric motor supplying power rotational to a lead screw which, according to the present invention, moves a secondary shift rail 56 axially and parallel to movement of a primary shift rail 52. The left secondary flange 56A and right secondary flange 56B are overlapped by the left coupling plate 62A and the right coupling plate 62B respectively. Disposed between the left coupling plate 62A and the right coupling plate 62B are a left actuation spring 60A and a right actuation spring 60B or any type of resilient element which comprise the mechanism of the present invention according to that shown in FIG. 2 when in a non-energized state.

Figure 3:
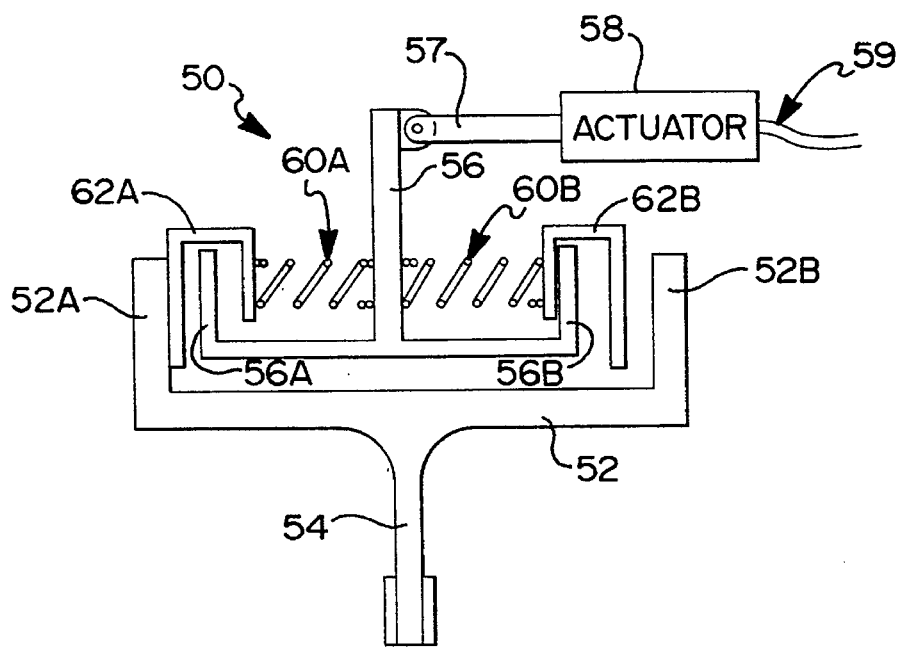
FIG. 3 is a cross-sectional view of the gear change transmission shift device of the present invention when a shift sequence is 50% complete.

The coupling plates 62A and 62B function to allow the activation springs 60A and 60B to act upon the primary shift rail as the secondary shift rail 56 is displaced by the actuator 58. FIGS. 2 and 3 illustrate the movement of the secondary shift rail 56 axially leftward where the coupling plate 62A allows the primary shift rail 52 to remain stationary (as would be the case if the gear was in a non-synchronous state). Likewise, if the secondary shift rail 56 were displaced from the non-energized state of FIG. 2 rightward, the coupling plate 62B would transfer the force of the activation spring 60B to the primary shift rail 52 while allowing the secondary shift rail to freely be displaced.

The activation springs 60A and 60B could be any type of resilient member which would provide a spring-like effect between the secondary shift rail 56 and the primary shift rail 52. An air cylinder could be used in place of the activation spring 60A which could incorporate a leak-down rate such that once the shift is made, the cylinder would automatically reduce its force level after a given time period.

The activation springs 60A and 60B have a spring rate of approximately 100 lbsf/inch and when installed have a static preload of approximately 50 lbsf. These values can be changed to suit the particular transmission design.

Once the secondary shift rail 56 has traversed the coupling plate 62A and contacted the side of the coupling plate 62A which abuts the primary shift rail primary flange 52A, any movement of the actuator 58 further leftward is transferred solidly to the primary shift rail 52 and subsequently to the shift fork 54. Thus, up to approximately 75% of the travel of the secondary shift rail 56 acts against the activation spring 60A and for the remaining 25% of the travel the secondary shift rail 56 acts directly on the primary shift rail 54. If the shift cannot be completed during the attempted last 25% of the travel, the actuator 58 will go into a stall condition and high electrical currents are possible. As an alternative design, the coupling plates 62A and 62B could be made wider to account for the full travel needed to complete a shift. In this configuration, no solid connection between the secondary shift rail 56 and the primary shift rail 52 would be established as the activation springs 60A or 60B would transfer the full shifting forces.

Now referring to FIG. 3 the gear change mechanism 50 of the present invention is shown with the actuator 58 energized acting upon the actuator link 57 thereby moving the secondary shift rail 56 to the left and displacing the secondary shift rail relative to the primary shift rail 52 and compressing the left actuation spring 60A to move into gear or into neutral (out of gear position) after a shift is made approximately 50% of the shift sequence has been completed. The position shown in FIG. 3 assumes that the shift cannot be completed due to, for example, a non-synchronous gear condition that the jaw clutch 21 cannot be moved axially to engage the mainshaft gear 16 as shown in FIG. 1 or a torque transfer condition that does not permit the shift fork 54 to be moved into the neutral out of gear position. By compressing the left actuation spring 60A by movement of the secondary shift rail 56 the primary shift rail 52 and as a consequence the shift fork 54 is preloaded with a force so that when synchronization between the jaw clutch 21 and the mainshaft gear 16 occurs, the shift can be completed. In the prior art, no actuation spring 60A was involved and if the jaw clutch 21 and the mainshaft gear 16 were not in synchronization, the actuator would be stalled and high industrial currents would be supplied to the motor causing heating and a reduction in service life of the actuator and/or possible mechanical damage to the gear shift mechanism 50. The right coupling plate 62B has also been moved by action of the right secondary flange 56B and as a consequence the right actuation spring 60B is in a normal state.

Now referring to FIG. 4, the gear change mechanism 50 of the present invention and shift is shown in a condition where approximately 75% of the shift has been completed and the actuator has moved to approximately three-quarters of travel thereby fully preloading the activation spring 60A. The actuator link 57 has been extended thereby axially displacing the secondary shift rail 56 further to the left causing the left actuation spring 60A to be further compressed thereby supplying additional preload to the primary shift rail 52 and the shift fork 54 through the left coupling plate 62A. Note that the shift fork has not been displaced axially due to the assumed non-synchronous condition of the jaw clutch 21 relative to the mainshaft gear 16. Once synchronization occurs, the primary shift rail 52 and the attached shift fork 54 move axially leftward to cause the jaw clutch 21 to engage the mainshaft gear 16, for example. In this manner, the actuator 58 can be powered through the power leads 59 to approximately 75% of travel condition and then stopped without additional current being supplied until the shift can be accomplished. At that time the actuator 58 can be further extended to move the primary shift rail 52 through the contact of the secondary shift rail 56 to the left coupling plate 62A and the left primary flange 52A which forces the jaw clutch 21 into engagement with the primary gear 16 in a definite manner upon which time the actuator 58 can be reversed so that the left actuation spring 60A and the right actuation spring 60B are balanced to consume a condition as shown in FIG. 2 until a shift back into neutral is desired.

Once the jaw clutch 21 has been axially displaced to engage the mainshaft gear 16, the actuator 58 can be reversed in direction retracting the actuator link 57 thereby causing the secondary shift rail 56 to be moved axially rightward compressing the right actuation spring 60B and preloading the primary shift rail 52 in the attached shift fork 54 to pull the jaw clutch 21 out of engagement with the primary gear 16 as soon as a driveline torque break occurs which can be effectuated, for example, by a change in throttle position. Using a prior art shift mechanism, the actuator would be solidly attached to the primary shift rail 52 and would go into a stall condition until a torque break occurred allowing the shift to be completed. Using the present invention, the right actuation spring 60B is compressed and preloads the primary shift rail 52 to move in a rightward direction as soon as a torque break occurs thereby allowing the actuator 58 to move the actuator link 57 to the position commanded by the shift control system and an actuator stall condition is prevented. In this manner, the timing of the shift sequence by the shift control system is desensitized and the shift algorithm can be simplified since the timing of the control signal to the actuator 58 is not as critical when using the present invention as compared to the prior art where a solid link is used between the actuator 58 and the primary shift rail 52.

In FIG. 5 an alternate embodiment of the present invention is shown where an actuator 58 is used to axially displace an actuator follower 74 which axially slides along a shift rail 76 so as to act upon and compress an actuation spring 82 through a coupler 80 thereby preloading the shift rail 76 and a shift fork 54 attached thereto for movement of a jaw clutch such as jaw clutch 21 as shown in FIG. 1. In a nonactivated state, the coupler first surface 100 contacts the rail flange first surface 102 forced together by activation spring 82. As the activation spring 82 is compressed eventually the coupler 80 contacts the inside of a rail flange 78 where the coupler second surface 104 contacts the rail flange second surface 106 thereby providing a solid link between the actuator mechanism which couples the actuator follower such as a ball screw mechanism where the lead screw 72 engages the actuator follower and rotates to move the actuator follower 74 along the shift rail 76. The gear change mechanism 70 shown in FIG. 5 would allow for the preload of the shift fork 54 in the leftward direction but provides for a solid link between the actuator and the shift rail 76 when moving in a rightward direction since the coupler 80 contacts the inside of the rail extension providing for a nonpreloaded forced condition acting to displace the shift fork 54 rightwardly in a more traditional manner. The coupler 80 holds the spring 82 in position and is shown as a part of the actuator follower 74 and moves therewith. This embodiment could be used to spring load the shift fork 54 when moving a jaw clutch to engage only one mainshaft gear rather than two. The shift control system would signal the engine to provide a torque break to pull the jaw clutch out of gear when moving rightward.

Figure 6:
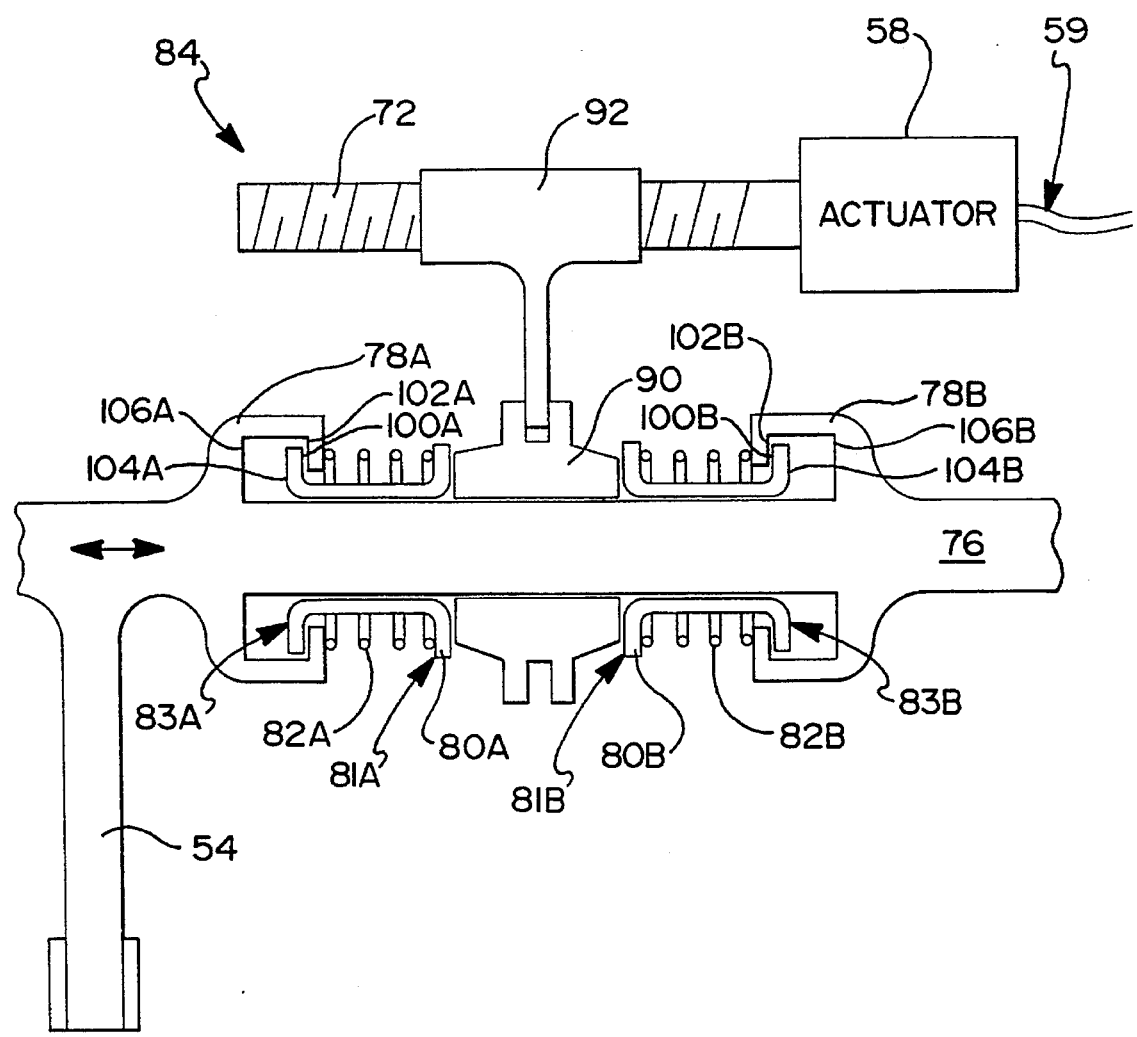
FIG. 6 is a cross-sectional view of a second alternate embodiment of the gear change transmission shift device of the present invention.

Now referring to FIG. 6, a second alternate embodiment of the present invention is shown where an actuator 58 is used to axially displace an actuator follower 92 through a mechanism such as a ball screw where the lead screw 72 engages the actuator follower and upon rotation of the actuator 58 moves the actuator follower leftward and rightward. The actuator follower 92 engages a rail follower 90 which axially slides on shift rail 76 and acts upon either a left actuation spring 82A or a right actuation spring 82B through a left coupler 80A having a first end 81A and a second end 83A or a right coupler 80B having a first end 81B and a second end 83B respectively, thereby causing a preload to be induced on the shift rail 76 and the attached shift fork 54 either in a leftward direction or a rightward direction.

If the jaw clutch 21 and the mainshaft gear 16, for example, are in a non-synchronous condition, a shift from neutral into gear cannot be effectuated and high forces will be generated if the actuator is solidly linked to the shift rail 76. By using the present invention, the actuator is coupled to the shift rail through either a left actuation spring 82A or a right actuation spring 82B thereby allowing the actuator 58 to be controlled and commanded to move the follower 92 to a position without the actuator 58 experiencing a stall condition which induces high currents and high mechanical loads into the system since the clutch control system does not know when a shift can be immediately completed without a complicated sensing and algorithm system. In the nonactivated state, the coupler first surfaces 100A and 100B contact rail flange first surfaces 102A and 102B respectively. Thus, if it is desired to axially displace the shift fork in a rightward direction either disengaging the jaw clutch 21 from the mainshaft gear 16 or to engage the jaw clutch 21 with mainshaft gear 18, the actuator is commanded through the power leads 59 to rotate and move the follower 92 rightwardly which in turn moves the rail follower 90 rightwardly to compress the right actuation spring and axially through the right coupler 80B which also moves axially with the follower 90 thereby compressing the right actuation spring 82B and inducing a preload on the shift rail 76 through the rail flange 78B and eventually the coupler second surface 104B contacts the rail flange second surface 106B if the shift cannot be made earlier. As soon as synchronization or a torque break occurs, the shift rail 76 moves axially rightward due to the preload on the right actuation spring 82B, thereby moving the shift fork axially and either disengaging or engaging a mainshaft gear. After the shift or the disengagement is completed, the left actuation spring 82A and the right actuation spring 82B assume the non-energized state as shown in FIG. 6. In a like manner, if it desires to move the shift fork 54 axially leftward, the actuator 58 is commanded to rotate and move the actuator follower 92 in a leftward direction which in turn moves rail follower 90 leftward compressing the left actuation spring if the shift cannot be immediately effectuated. If the shift can be immediately effectuated, then the left actuation spring is minimally compressed and the shift rail 76 moves axially leftward to immediately move the shift fork 54 into the desired position. If the shift cannot be effectuated immediately, then the left actuation spring 82A is compressed through the left coupler 80A which supplies a forced preload on the left rail flange 78A and onto the shift rail 76. Eventually as the actuator continues to axially displace the follower leftward, the left coupler 80A contacts the left rail flange 78A when the coupler second surface 104A contacts the rail flange second surface 106A to provide a solid link between the actuator and the shift rail 76 where the position of the follower 92 determines the position of the shift fork 54 in a more conventional manner.

Although this invention has been described in its preferred form with a certain degree of particularity, it is understood that the present disclosure of the preferred embodiment has been made only by way of example, and that numerous changes in the detailed construction in combination and arrangement of the pans may be resorted to without departing from the spirit and the scope of the invention, as hereinafter claimed.

We claim:

1. A transmission shifting system for a transmission of the type wherein a plurality of transmission gears are shifted into rotational relationship with a transmission shaft using an axially displaceable shift fork comprising:

actuator means responsive to a command signal;

a primary shift rail attached to said shift fork moveable to cause said transmission gears to be shifted into rotational relationship with said transmission shaft;

a secondary shift rail attached to said actuator means disposed to move axially substantially parallel to said primary shift rail;

at least one coupling plate disposed to contact said primary shift rail and said secondary shift rail allowing limited axial movement between said primary shift rail and said secondary shift rail in a shift direction, said coupling plate contacting said primary shift rail when in a non-energized state and when in a substantially energized state;

at least one actuation spring disposed between said secondary shift rail and said coupling plate.

2. The transmission shifting system of claim 1, wherein said actuation spring is a coil spring.

3. The transmission shifting system of claim 2, wherein said actuation spring has a spring rate of approximately 100 lbsf/in and an installed preload of 50 lbsf.

4. The transmission shifting system of claim 1, wherein said primary shift rail is further comprised of two primary flanges positioned one at each end of said primary shift rail and wherein said secondary shift rail is further comprised of two secondary flanges positioned one at each end of said secondary shift rail where said coupling plate engages said primary shift rail and said secondary rail at said primary flange and at said secondary flange.

5. A transmission shifting system for a gear change transmission having a slidably engageable and disengageable gear drive comprising:

actuator means responsive to a control signal;

a shift rail axially moveable to cause said gear drive to engage and disengage said shift rail having a rail flange and a shift fork formed thereon;

an actuator follower coupled to said actuation means and adapted to axially translate upon activation of said actuator means by said control signal, said actuator follower having a coupler extending to engage said rail flange where said coupler has a first and second surface and said rail flange has a first and second surface, said first surface of said coupler contacting said first surface of said rail flange when said shifting system is non-energized and said second surface of said coupler contacting said second surface of said rail flange when said shifting system is energized to at least approximately 75 percent of travel and said shift fork has not been substantially displaced;

an activation spring disposed between said rail flange and said actuator follower where said actuator follower is moved axially by said actuator means thereby tending to compress said activation spring.

6. A transmission shifting system for a gear change transmission having a slidably engageable and disengageable gear drive comprising:

actuator means responsive to a control signal;

a shift rail axially moveable to cause said gear to become engaged and disengaged, said shift rail having a pair of rail flanges formed thereon;

an actuator follower coupled to said actuator means axially translational with activation of said actuator means by said control signal;

a rail follower axially slidably supported on said shift rail;

a pair of couplers axially slidably supported on said shift rail and acted upon by said rail follower, said couplers each having a first end adjoining said activator follower and a second end axially trapped by said rail flange, said couplers each engaging said rail flanges respectively to limit the distance between the rail flange and a respective coupler;

a pair of activation springs disposed one each between said rail flange and said first end of said coupler;

said activation springs being compressed by the axial displacement of said actuator follower acting upon said coupler.

7. The transmission shifting system of claim 6, wherein said actuator means is an electric motor driving a lead screw.

8. The transmission shifting system of claim 6, wherein said actuator means is an electric motor driving a ball screw.

9. The transmission shifting system of claim 6, wherein said activation spring is a coil spring surrounding a portion of said shift rail.

* * * * *